United States Patent  
Ohr et al.

(10) Patent No.: US 8,438,136 B2  
(45) Date of Patent: May 7, 2013

(54) BACKUP CATALOG RECOVERY FROM REPLICATED DATA

(75) Inventors: James P. Ohr, Saint Paul, MN (US); Timothy J. Stevens, Andover, MN (US)

(73) Assignee: Symantec Corporation, Mountain View, CA (US)

( * ) Notice: Subject to any disclaimer, the term of this patent is extended or adjusted under 35 U.S.C. 154(b) by 751 days.

(21) Appl. No.: 11/862,901

(22) Filed: Sep. 27, 2007

(65) Prior Publication Data

US 2009/0089340 A1    Apr. 2, 2009

(51) Int. Cl.  
G06F 17/00 (2006.01)  
G06F 7/00 (2006.01)

(52) U.S. Cl.  
USPC .......................................... 707/661; 707/668

(58) Field of Classification Search .................. 707/668, 707/661, 999.204  
See application file for complete search history.

(56) References Cited

U.S. PATENT DOCUMENTS

| | | | |
|---|---|---|---|
| 5,991,542 A | 11/1999 | Han | |
| 2002/0091710 A1* | 7/2002 | Dunham et al. | 707/200 |
| 2002/0174139 A1* | 11/2002 | Midgley et al. | 707/204 |
| 2003/0120751 A1* | 6/2003 | Husain et al. | 709/219 |
| 2003/0154199 A1* | 8/2003 | Thomas et al. | 707/10 |
| 2004/0098717 A1* | 5/2004 | Husain et al. | 718/100 |

OTHER PUBLICATIONS

"How to Perform a True Image Restore;" Symantec.com, Nov. 14, 2004; http://seer.entsupport.symantec.com/docs/267780.html.

* cited by examiner

Primary Examiner — Jacob F. Bétit  
Assistant Examiner — John P Hocker  
(74) Attorney, Agent, or Firm — Meyertons, Hood, Kivlin, Kowert & Goetzel, P.C.

(57) ABSTRACT

A method, system, and computer-readable storage medium are disclosed for recovering a backup catalog from replicated data. A set of catalog metadata may be stored in a metadata object on a first storage device. The set of catalog metadata may describe a plurality of files stored in an archive. The metadata object and the archive may be copied to a second storage device, thereby generating a replicated metadata object and a replicated archive on the second storage device. The set of catalog metadata may be imported from the replicated metadata object into a destination backup catalog. The destination backup catalog describes the plurality of files stored in the replicated archive.

13 Claims, 6 Drawing Sheets

BACKUP CATALOG RECOVERY FROM REPLICATED DATA

BACKGROUND OF THE INVENTION

1. Field of the Invention

This invention is related to the field of computer systems and, more particularly, to the recovery of catalog metadata associated with archived data.

2. Description of the Related Art

Enterprise computing systems commonly use configurations such as the storage area network (SAN), network attached storage (NAS), and other centralized storage mechanisms to simplify storage, improve availability, and handle escalating demands for data and applications. The SAN model places storage on its own dedicated network. This dedicated network most commonly uses Fibre Channel technology as a versatile, high-speed transport. The SAN may include one or more storage hosts that provide a point of interface with local area network (LAN) users and may also include one or more fabric switches, SAN hubs, and/or other intermediate entities to accommodate a large number of storage devices. The hardware (e.g., switches, hubs, bridges, routers, cables, etc.) that connects servers to storage devices in a SAN is referred to as a "disk fabric" or "fabric." The SAN fabric may enable server-to-storage device connectivity through Fibre Channel switching technology to a wide range of servers and storage devices.

The SAN and other centralized storage mechanisms may be used to implement backup solutions in enterprise environments. Tape devices have traditionally been used as a high-capacity backup medium. Some backup environments may use available disk-based storage (e.g., in a SAN) for backup, either as a final backup destination or as an intermediate location for staging the data to tape. A software-based backup solution such as NetBackup™ from Symantec Corporation may permit clients to archive data to storage devices in a networked backup environment. In a backup solution such as NetBackup™, metadata associated with the archived data is typically stored in a catalog.

Data archived using a backup solution such as NetBackup™ can be replicated to a disaster recovery site for an additional level of security. The disaster recovery site is often at a remote location relative to the primary site. To import the replicated archived data into another instance of the backup solution at the disaster recovery site, the catalog for the archived data must typically be rebuilt by reading the entire replicated archive to locate and process the metadata (e.g., .tar headers). However, this process may be undesirably slow.

Alternatively, the entire catalog may be replicated from the primary site along with the archived data. Because the catalog typically stores metadata for with a superset of the archived data, replication of the entire catalog may result in the replication of unnecessary amounts of metadata. Furthermore, if the disaster recovery site is used to maintain archived data from multiple primary sites, management of the multiple sets of archived data with a single instance of the backup solution may preclude full catalog replication from a single one of the primary sites.

SUMMARY

A method, system, and computer-readable storage medium are disclosed for recovering a backup catalog from replicated data. In one embodiment, a set of catalog metadata may be stored in a metadata object on a first storage device. The set of catalog metadata may describe a plurality of files stored in an archive. In one embodiment, the metadata object may be stored as a separate file from the archive file on the first storage device. The metadata object may comprise a metadata file referred to as a "sidecar" file. Alternatively, the metadata object may comprise an object stored within the archive itself. The set of catalog metadata may be a subset of catalog metadata stored in a source backup catalog. The metadata object and the archive may be copied to a second storage device, thereby generating a replicated metadata object and a replicated archive on the second storage device.

In one embodiment, the presence of the replicated metadata object may be automatically detected on the second storage device. For example, the replicated metadata object may be automatically detected based on the name of the replicated metadata object (e.g., the name of the file may include a unique string such as "sidecar"). The name of the replicated metadata object may also indicate the relationship between the replicated metadata object and the replicated archive file.

The set of catalog metadata may be imported from the replicated metadata object into a destination backup catalog. After importing the catalog metadata in this manner, the destination backup catalog may describe the plurality of files stored in the replicated archive. In one embodiment, the set of catalog metadata may be automatically imported into the destination backup catalog in response to the automatic detection of the replicated metadata object on the second storage device.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Using embodiments of the systems and methods described herein, a backup catalog may be recovered from replicated data. A separate "sidecar" file including a subset of metadata from a catalog may be stored or otherwise associated with a related set of archived data. Both the archived data and the sidecar file may be replicated (e.g., to a remote site). In importing the archived data at the remote site, the catalog for the archived data may be efficiently built by reading the metadata in the sidecar file. FIGS. 1, 2, and 4-6 illustrate examples of computer systems and networked environments that may be used with the systems and methods for backup catalog recovery described herein. The example configurations shown in FIGS. 1, 2, and 4-6, and the quantity and kind of elements shown therein, are intended to be illustrative rather than limiting, and other embodiments are possible and contemplated.

Figure 1:
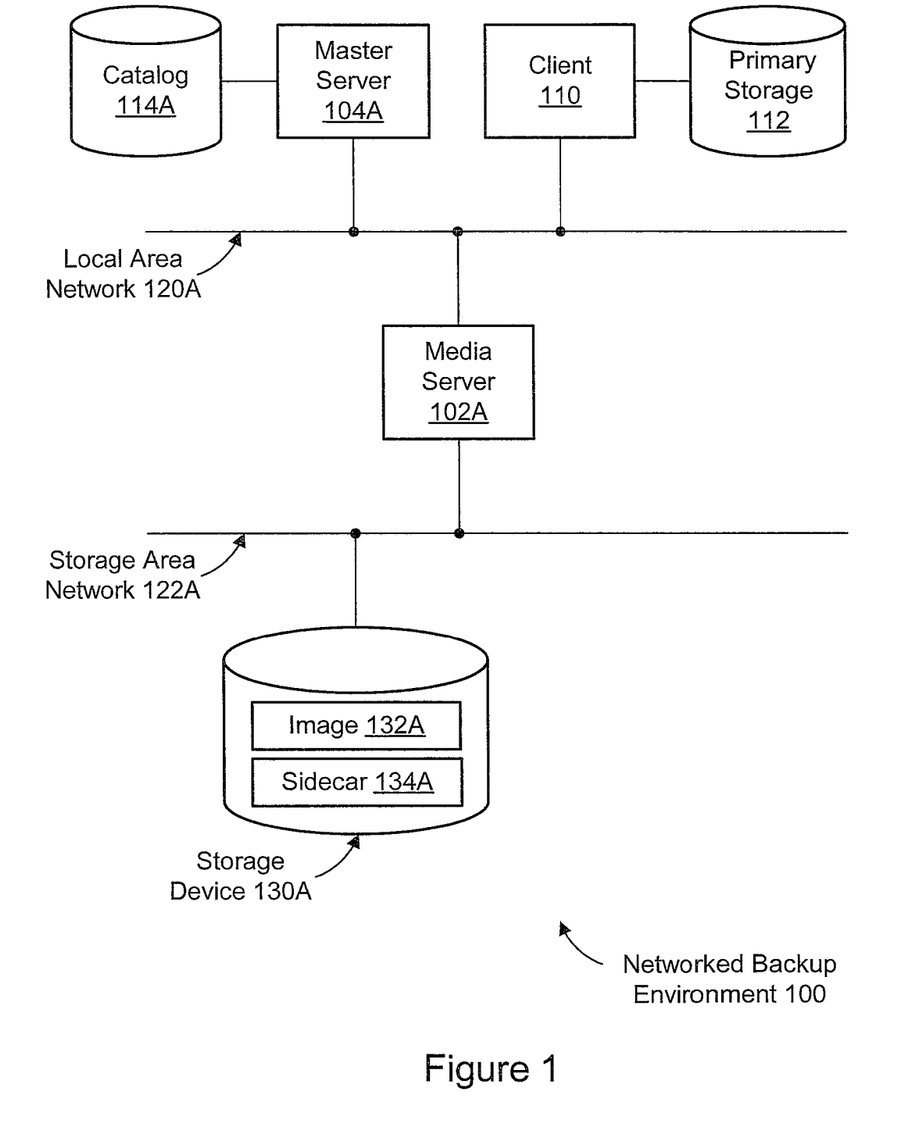
FIG. 1 illustrates a networked backup environment usable for backup catalog recovery according to one embodiment.

FIG. 1 illustrates a networked backup environment 100 usable for backup catalog recovery according to one embodiment. In one embodiment, the networked backup environment 100 may utilize any of various suitable backup solutions (e.g., NetBackup™) from Symantec Corporation. One or more computer systems referred to as media servers (e.g., media server 102A) may be coupled to one or more storage devices (e.g., storage device 130A). In one embodiment, the media servers may be coupled to the storage devices over a storage area network (SAN) 122A. The storage device 130A may comprise a hard disk drive, disk array, tape device, virtual tape library (VTL), or a device implemented using any other suitable storage technologies. In the networked backup environment 100, the primary role of the media server 102A may be to move data (e.g., from primary storage 112) to backup storage on the storage device 130A. Accordingly, the media server 102A may also be referred to as a data mover.

In one embodiment, one or more of the storage devices (e.g., storage device 130A) may be partitioned into one or more logical volumes or other independently accessible portions. In one embodiment, one or more of the storage devices may include one or more Logical Unit Numbers (LUNs), each of which may store one or more of the volumes. A LUN may comprise an externally addressable entity within a target device that implements a SCSI device model. The pool of LUNs to be shared by the media servers may be referred to as a disk pool. Individual volumes and the backup images stored within the volumes may be dynamically shared by the media servers.

The media server 102A may also be coupled to other entities, such as at least one client 110 and a master server 104A, over a local area network (LAN) 120A. The client 110 may be attached (directly or over a network) to primary storage 112 from which data is backed up in a backup operation or to which data is restored in a restore operation. The client 110 may include a client agent that communicates with the media server 102A and/or the master server 104A in performing the backup or restore operations.

In one embodiment, the master server 104A may manage data protection activities such as the scheduling of backup operations and the maintenance of metadata associated with archived data. The master server 104A may be coupled to one or more storage devices such as a catalog 114A. As will be discussed in greater detail below, the catalog 114A may store metadata describing archived data (e.g., data backed up to the storage device 130A). In one embodiment, the master server 104A or another controlling component may provide for allocation of shared volumes between a plurality of media servers. Therefore, access by the media server 102A to the storage device 130A may be arbitrated by the master server 104A. In one embodiment, an administration console may provide a graphical user interface (GUI) and/or command-line interface (CLI) for configuration of the networked backup environment 100. The administration console may also be provided in the master server 104A.

The SAN 122A is typically a high-speed network that allows the establishment of direct connections between storage devices (e.g., storage device 130A) and hosts (e.g., media server 102A). To enable connections between the storage device 130A and media server 102A, the SAN 122A may include various elements in a SAN fabric such as one or more switches, routers, hubs, etc. Various of the elements in the SAN fabric may include network and storage interfaces, memories, and processors operable to execute program instructions. In one embodiment, the media server 102A and/or elements in the SAN fabric may include a volume manager that enables the management of physical storage resources as logical entities (e.g., volumes).

The primary storage 112 may include data which is intended to be backed up. As used here, the terms "backed up" and "archived" may be used interchangeably to indicate data that is copied from primary storage to backup storage. In one embodiment, a backup operation may be performed to archive a set of data from the primary storage 112. The backup operation may be scheduled and managed by the master server 104A according to user-specified and/or default parameters. The backup operation for the primary storage 112 may be performed on a routine basis. The master server 104A may determine a particular media server 102A and a particular storage device 130A for use in a backup operation or a restore operation. The choice of the particular media server 102A and storage device 130A may be based on various factors such as user-specified or default parameters, load-balancing considerations, availability considerations, etc. In one embodiment, the data to be archived may be read from the primary storage 112 by the client 110 and sent to the selected media server 102A over the LAN 120A. In another embodiment, where the media server 102A is coupled to the primary storage 112 through the LAN 120A or SAN 122A, the media server 102A may read the data from the primary storage 112 directly without the client 110 acting as an intermediary.

As a result of the backup operation, a disk image 132A comprising archived data may be written to the storage device 130A. The disk image 132A may comprise an entire disk or volume (e.g., a disk or volume in primary storage 112) or a subset of files from a particular disk or volume (e.g., in primary storage 112). In one embodiment, the disk image 132A may comprise a selection of files from a plurality of disks or volumes. The disk image 132A may comprise a file in the standard "tar" format (i.e., a "tarball"). In the tar file, the archived files (e.g., from the primary storage 112) may be concatenated, with each file preceded by a header block.

As another result of the backup operation, metadata regarding the backup operation and/or the target set of data may be written to the catalog 114A. For example, the catalog 114A may be updated with the location of the image 132A in the networked backup environment (e.g., on the storage device 130A), the location of particular files within the image 132A, the data of the backup, and other suitable metadata. Portions of the metadata in the catalog 114A may overlap the information contained in the headers for individual files in the archived tar file. The metadata in the catalog 114A may be referenced, for example, in future backup operations and/or restore operations.

In the embodiment shown in FIG. 1, a "sidecar" file 134A corresponding to the image 132A may also be written to the storage device 130A. In another embodiment, the sidecar file 134A may be written to a different storage device than the device on which the archived image 132A is stored. The sidecar file 134A may store metadata corresponding to the disk image 132A and its contents. However, in contrast to the catalog 114A, which typically stores metadata for a plurality of images resulting from a plurality of backup operations, the sidecar file 134A may comprise a set of metadata specific to the disk image 132A, the contents of the disk image 132A, and/or the backup operation that generated the image 132A. The sidecar file 134A may therefore comprise an set of metadata optimized for quick recovery of the corresponding image 132A. The contents of the sidecar file 134A are further discussed below with reference to FIG. 5.

In one embodiment, the sidecar 134A may be generated from the catalog 114A when the corresponding image 132A is designated for replication. A configuration option may be used to indicate which images are to be stored to a replicated location, and a corresponding sidecar file may be generated and stored only for those images that are planned for replication. In another embodiment, the sidecar file 134A may be generated from the corresponding metadata in the catalog 114A during the backup operation. In this embodiment, the metadata in the sidecar file 134A may be generated at substantially the same time as the corresponding metadata in the catalog 114A.

In one embodiment, the image 132A may be designated as part of a disaster recovery (DR) set. The disk image 132A may therefore comprise a set of files considered essential to the organization operating the first networked backup environment 100. To designate the image 132A for disaster recovery, a DR attribute may be specified as part of a particular backup policy and/or schedule. Alternatively, a DR attribute may be specified for the storage device 130A and then implicitly applied to a policy or schedule using the storage device 130A.

Figure 2:
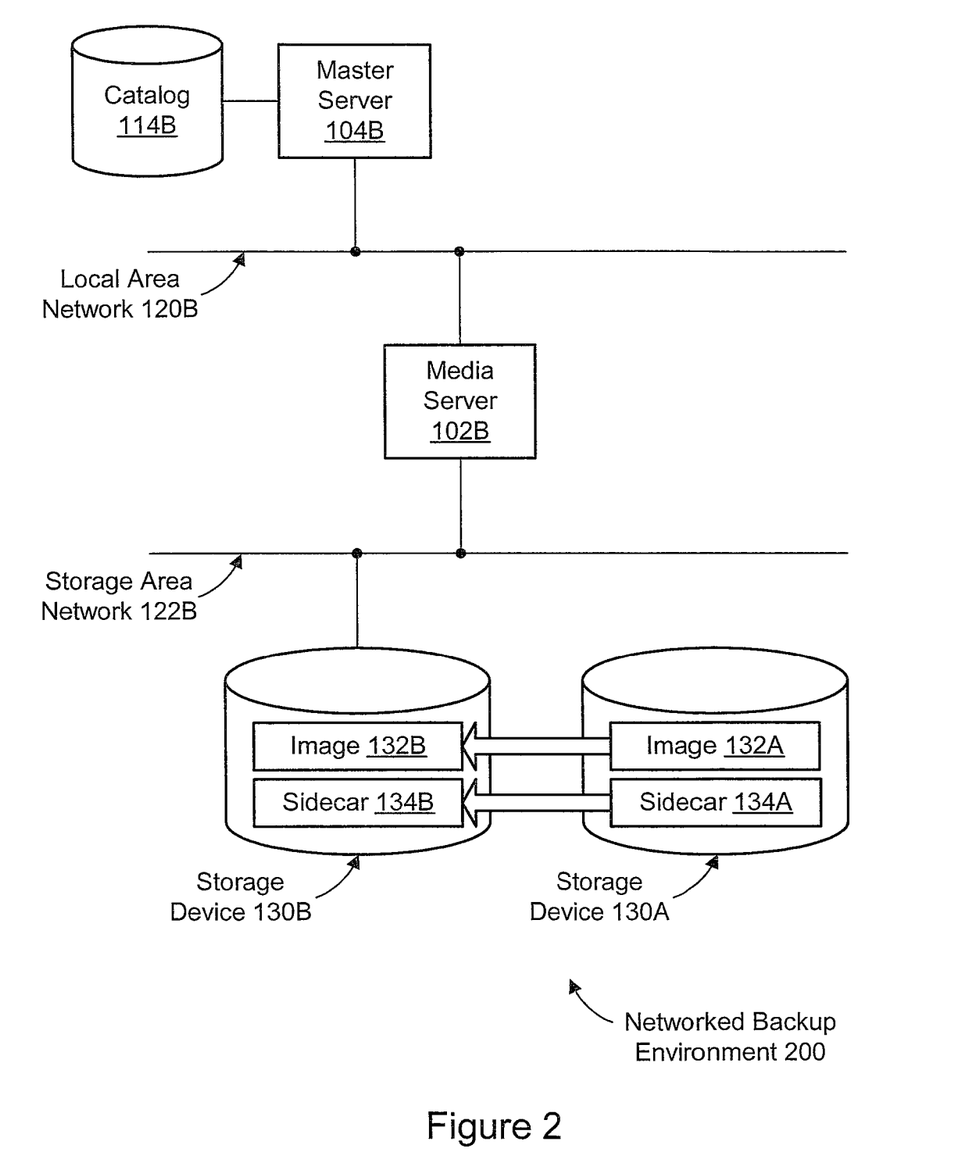
FIG. 2 illustrates a networked backup environment including backup catalog recovery from replicated data according to one embodiment.

FIG. 2 illustrates a second networked backup environment 200 including backup catalog recovery from replicated data according to one embodiment. The disk image 132A and associated sidecar file 134A may be replicated (as image 132B and sidecar 134B) to a second storage device 130B. The replication may generate substantially exact copies of the image 132A and sidecar 134A. In one embodiment, the second storage device 130B may be located at a remote site such as a designated disaster recovery site. In one embodiment, the replication of the image 132A and sidecar 134A may occur over a network linking the first networked backup environment 100 and the second networked backup environment 200. In one embodiment, the replication may include physically moving all or part of the storage device 130B (e.g., replicated tape media comprising the image 132B and sidecar 134B) from a primary site to a remote site. In another embodiment, the storage device 130A and storage device 130B may be the same device (i.e., the replication process is bypassed).

In the second networked backup environment 200, another media server 102B may be coupled to the storage device 130B via another SAN 122B. The media server 102B may also be coupled to another master server 104B via another LAN 120B, and the master server 104B may be coupled to a storage device that stores another catalog 114B. The media server 102B may act as a "data mover" between the storage device 130B and the master server 104B. In one embodiment, to import the image 132B into an instance of a backup solution such as NetBackup™ the second networked backup environment 200, the catalog 114B should be updated with metadata regarding the image 132B. Instead of slowly reading the entire replicated image 132B to locate the relevant metadata (e.g., tar headers in a tar file), the metadata may be read from the simpler sidecar file 134B associated with the image 132B. The catalog 114B may be updated with the metadata obtained from the sidecar 134B, thereby allowing the image 132B to be imported in the second environment 200 with relative speed. In one embodiment, the sidecar file 134B may be imported by a NetBackup™ instance and used to recreate the files portion of the catalog 114B. Importing the sidecar file 134B may comprise populating the catalog 114B with metadata entries for files in the replicated image 132B.

Figure 3:
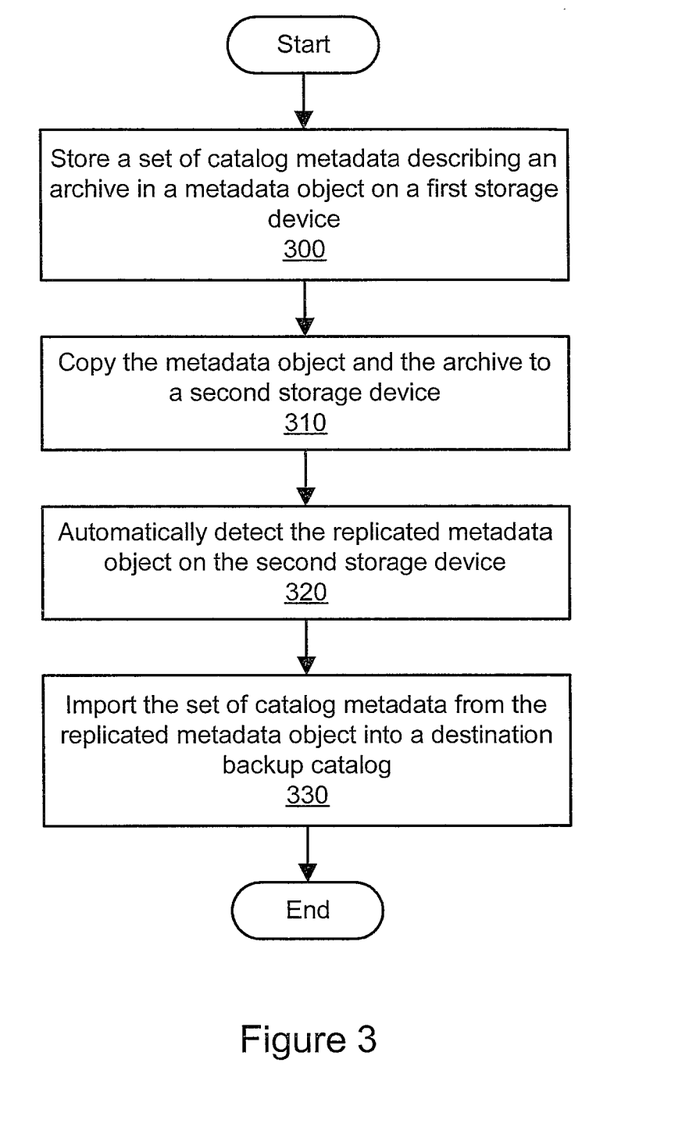
FIG. 3 is a flow diagram illustrating a method for backup catalog recovery from replicated data according to one embodiment.

FIG. 3 is a flow diagram illustrating a method for backup catalog recovery from replicated data according to one embodiment. In a backup operation, a plurality of files may be stored in an archive (i.e., an image) 132A on the storage device 130A. As indicated at 300, a set of catalog metadata may be stored in a metadata object (e.g., a metadata file referred to as a sidecar file 134A) on a first storage device 130A. The set of catalog metadata may describe the plurality of files stored in the archive 132A. In one embodiment, the metadata object may be stored as a separate file from the archive file 132A on the first storage device 130A. Alternatively, the metadata object may comprise an object stored within the archive itself. In one embodiment, the set of catalog metadata may be copied from a source backup catalog 114A. The set of catalog metadata may be a subset of catalog metadata stored in the source backup catalog 114A, and the catalog metadata stored in the source backup catalog may comprise additional catalog metadata describing an additional plurality of files stored in one or more additional archives. In one embodiment, the set of catalog metadata may be automatically stored in the metadata object in response to receiving input (e.g., from a user) designating the plurality of files stored in the archive for replication.

As indicated at 310, the metadata object and the archive 132A may be copied to a second storage device 130B, thereby generating a replicated metadata object and a replicated archive 132B on the second storage device 130B. In one embodiment, copying the metadata object and the archive to the second storage device 130B may be performed automatically in response to receiving input (e.g., user input) designating the plurality of files stored in the archive as a disaster recovery set.

As indicated at 320, the replicated metadata object may be automatically detected on the second storage device. As will be discussed in greater detail below with respect to FIG. 4, the replicated metadata object may be automatically detected based on the name of the replicated metadata object. The name of the replicated metadata object may also indicate the relationship between the replicated metadata object and the replicated archive.

As indicated at 330, the set of catalog metadata may be imported from the replicated metadata object into a destination backup catalog 114B. After importing the catalog metadata in this manner, the destination backup catalog 114B may describe the plurality of files stored in the replicated archive 132B. In one embodiment, the set of catalog metadata may be automatically imported into the destination backup catalog in response to the automatic detection of the replicated metadata object on the second storage device.

Figure 4:
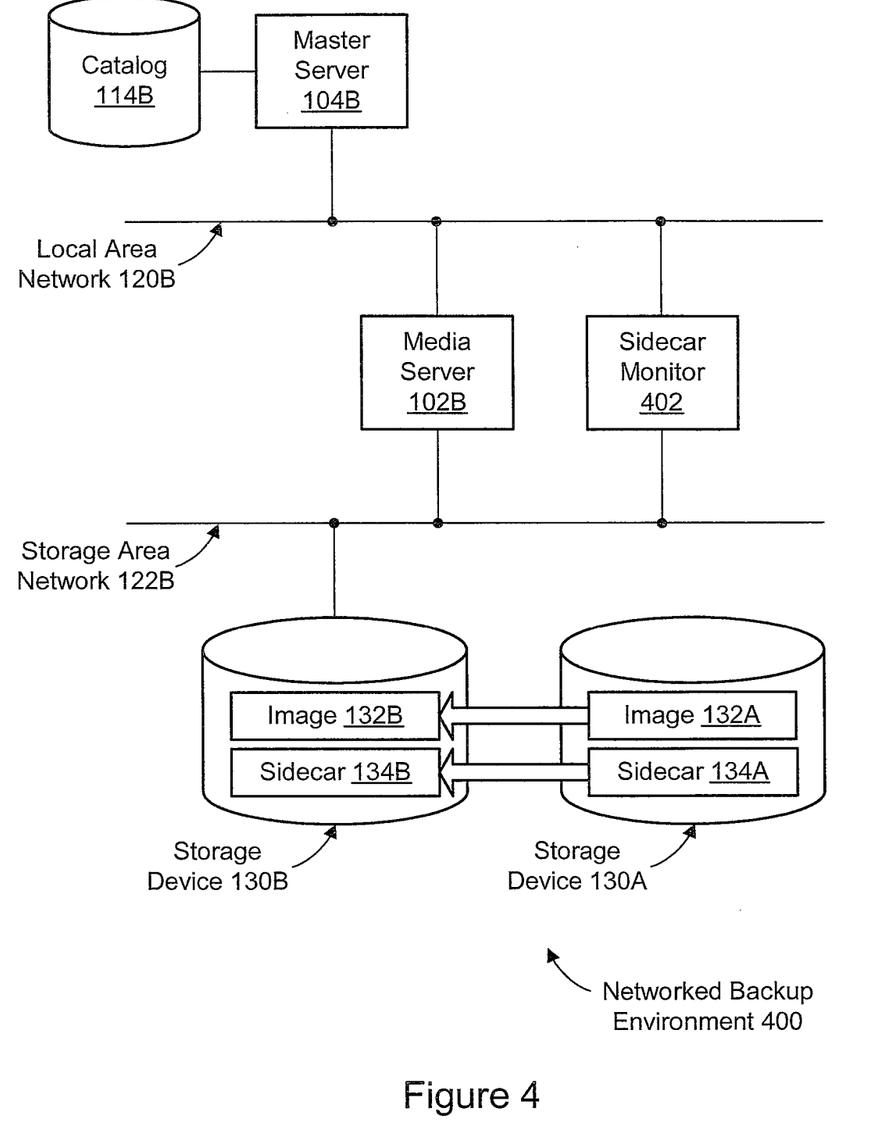
FIG. 4 illustrates a networked backup environment including backup catalog recovery with automatic monitoring of replicated data according to one embodiment.

FIG. 4 illustrates a networked backup environment 400 including backup catalog recovery with automatic monitoring of replicated data according to one embodiment. The networked backup environment 400 may include substantially the same components as the networked backup environment 200 shown in FIG. 2. Additionally, the networked backup environment 400 may include a monitor 402, also referred to herein as a sidecar monitor. The monitor 402 may automatically detect the presence of a new sidecar file in the storage device 130B. In response to the detection of the new sidecar file 134B, the monitor may automatically initiate the importing of the associated image 132B using the sidecar 134B. In one embodiment, the monitor 402 may poll the storage device 130B to detect new sidecar files. In another embodiment, the detection of new sidecar files may be event-driven. The monitor may comprise program instructions executed in the media server 102B, in another computer system coupled to the SAN 122B, in a component of the SAN fabric, or in any other suitable location in the networked backup environment 400.

In one embodiment, a standardized nomenclature for the sidecar file 134B may indicate its nature as a file containing optimized metadata for a replicated image 132B. For example, the sidecar file 134B may include the term "sidecar" or another suitable string in its file name. The sidecar file 134B may also have a name similar to that of the corresponding image file 132B so that the link between the two files is established. For example, if the name of the image 132B includes "archive1.tar," then the name of the corresponding sidecar 134B may include "archive1.sidecar" in one embodiment.

Figure 5:
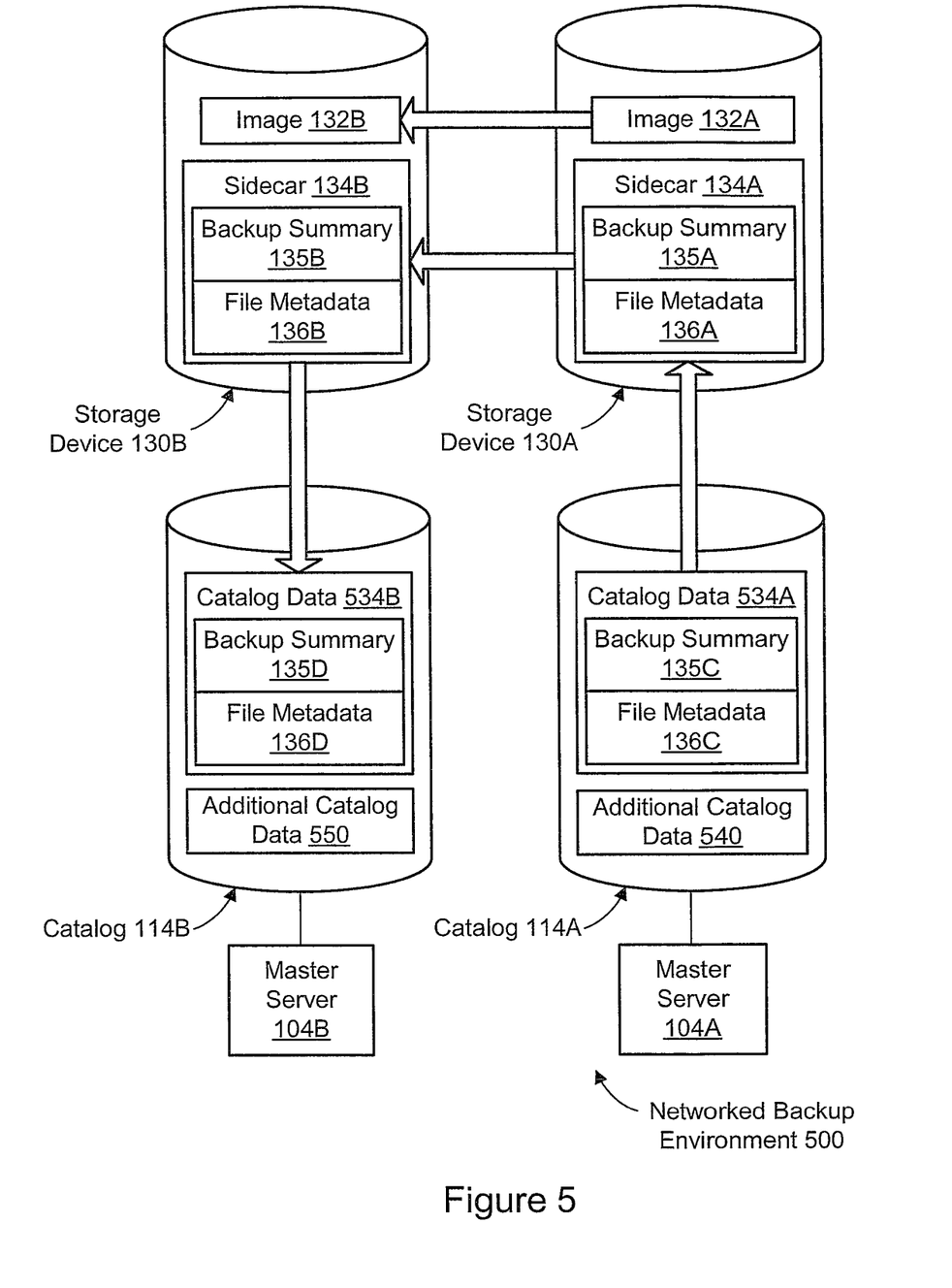
FIG. 5 illustrates a networked backup environment including backup catalog recovery from replicated data according to one embodiment.

FIG. 5 illustrates a networked backup environment 500 including backup catalog recovery from replicated data according to one embodiment. The original catalog 114A at the primary site may store the catalog data 534A used to generate the sidecar 134A in addition to additional catalog data 540. In other words, the catalog data 534A may relate specifically to the image 132A and its contents. The additional catalog data 540 may comprise metadata associated with other archived data (e.g., other images). The catalog data 534A relevant to the image 132A may comprise both a backup summary 135C and individual file metadata 136C. The backup summary 135C may comprise metadata regarding the backup operation that produced the image 132A and/or high-level metadata regarding the image 132A itself. For example, the backup summary 135C may comprise the backup type, the backup ID, an expiration date, locations of image fragments, etc. The individual file metadata 136C may comprise metadata regarding a plurality of individual files in the image 132A. In one embodiment, the individual file metadata 136C may comprise a set of records substantially similar to the tar headers in the image 132A. The individual file metadata 136C may comprise one or more files suffixed with ".f" in one embodiment.

In generating the sidecar 134A, the backup summary 135C in the catalog 114A may essentially be copied to the backup summary 135A in the sidecar 134A, and the file metadata 136C in the catalog 114A may essentially be copied to the file metadata 136A in the sidecar 134A. Similarly, the replicated version of the sidecar 134B may comprise the backup summary 135B and the file metadata 136B. When the sidecar 134B is imported to the second catalog 114B, the backup summary 135B may essentially be copied to the backup summary 135D in the catalog 114B, and the file metadata 136B may essentially be copied to the file metadata 136D in the catalog 114B. The second catalog 114B may also comprise additional catalog data 550. The additional catalog data 550 may comprise metadata associated with other archived data (e.g., other replicated images).

Figure 6:
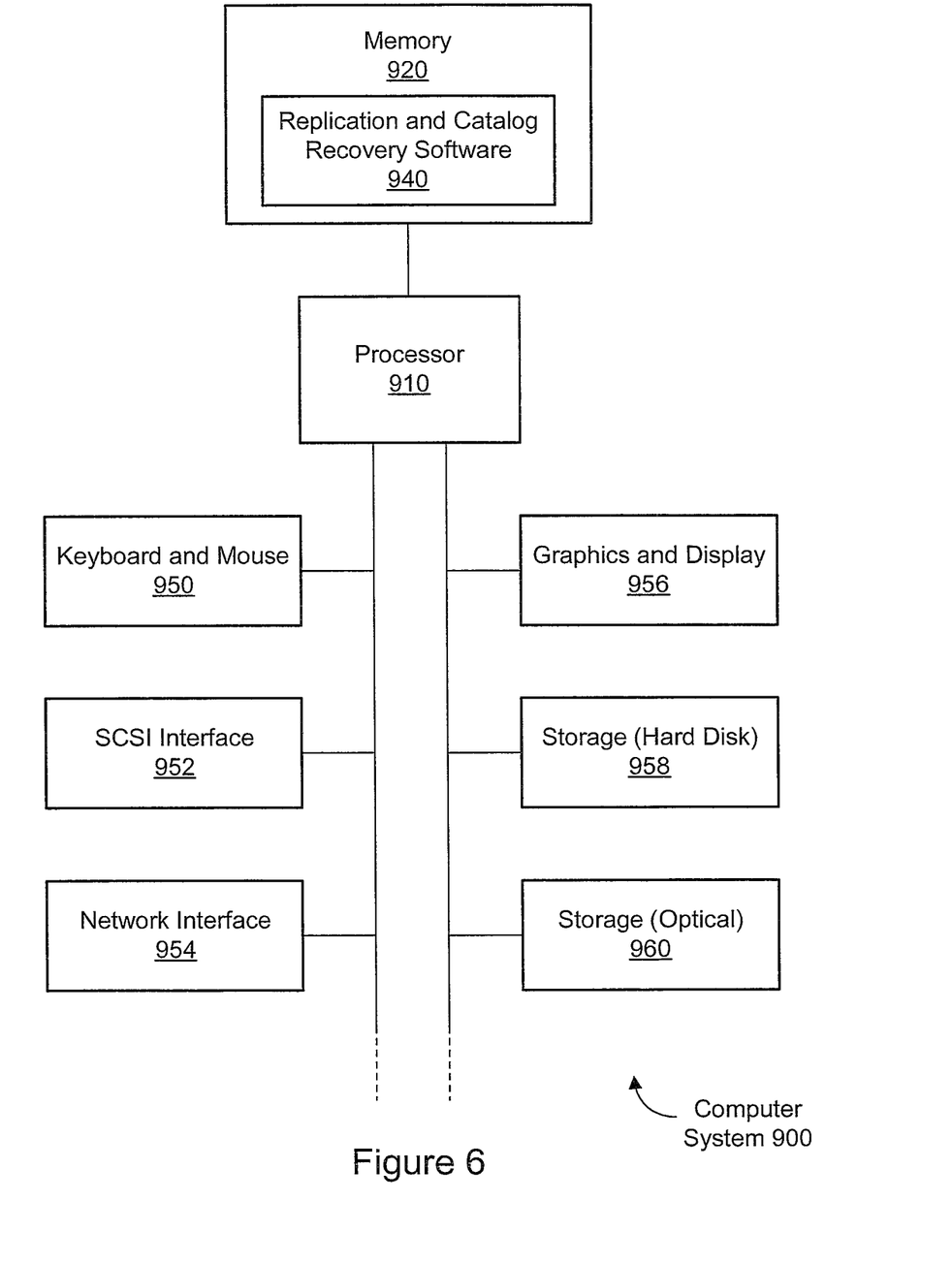
FIG. 6 illustrates a typical computer system configured to implement embodiments of the systems and methods described above.

FIG. 6 illustrates a block diagram of a typical computer system 900 for implementing embodiments of the systems and methods described above. Computer system 900 may be illustrative of various computer systems in the networked backup environment 100, 200, 400, and 500, such as a media server 102A and 102B, a master server 104A and 104B, a client 110, and/or various elements in a SAN fabric. Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., software 940 for replication and catalog recovery using the techniques discussed herein. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk storage 958, and/or optical storage 960, all of which may be coupled to processor 910 by at least one communications bus. Computer system 900 can also include numerous elements not shown in the figure, such as additional storage devices, communications devices, input devices, and output devices, as illustrated by the ellipsis shown.

The techniques and methods discussed above may be implemented in software as one or more software programs, using a variety of computer languages, including, for example, traditional computer languages such as assembly language and C; object oriented languages such as C++ and Java; and scripting languages such as Perl and Tcl/Tk. Software 940 may comprise program instructions executable by processor 910 to perform any of the functions or methods described above.

Various embodiments may further include receiving, sending, or storing instructions and/or data implemented in accordance with the foregoing description upon a computer-accessible medium. Generally speaking, computer-accessible media may include storage media or memory media such as magnetic or optical media, e.g., disk or CD-ROM, volatile or non-volatile media such as RAM (e.g., SDRAM, DDR, RDRAM, SRAM, etc.), ROM, etc. In one embodiment, computer-accessible media may include transmission media or signals such as electrical, electromagnetic, or digital signals, conveyed via a communication medium such as a network and/or a wireless link.

The various methods as illustrated in the Figures and described herein represent exemplary embodiments of methods. The methods may be implemented in software, hardware, or a combination thereof. The order of the method elements may be changed, and various elements may be added, reordered, combined, omitted, modified, etc. Method elements may be performed automatically (i.e., without user intervention) and programmatically (i.e., according to program instructions executed by a computer).

Various modifications and changes may be made as would be obvious to a person skilled in the art having the benefit of this disclosure. It is intended that the invention embrace all such modifications and changes and, accordingly, the above description and drawings to be regarded in an illustrative rather than a restrictive sense.

What is claimed is:

1. A computer-implemented method comprising:
storing an archive on a first backup storage device, wherein the archive comprises a plurality of files copied from a primary storage device;
storing a metadata object on the first backup storage device, wherein the metadata object comprises a set of catalog metadata describing the plurality of files stored in the archive, and wherein the metadata object is generated from a first backup catalog;
copying the metadata object and the archive from the first backup storage device to a second backup storage device, wherein copying the metadata object and the archive comprises generating a replicated metadata object and a replicated archive stored on the second backup storage device;

automatically detecting the replicated metadata object on the second backup storage device based on a name of the replicated metadata object, wherein the name of the replicated metadata object and a name of the replicated archive comprise a common substring indicating a relationship between the replicated metadata object and the replicated archive, and wherein the name of the replicated metadata object comprises an additional substring indicating that the replicated metadata object comprises catalog metadata; and importing the set of catalog metadata into a second backup catalog, wherein the imported set of catalog metadata is read from the replicated metadata object stored on the second backup storage device instead of from the replicated archive, wherein importing the set of catalog metadata comprises updating the second backup catalog to describe the plurality of files stored in the replicated archive on the second backup storage device, and wherein importing the set of catalog metadata is performed automatically in response to automatically detecting the additional substring in the name of the replicated metadata object on the second backup storage device.

2. The computer-implemented method of claim 1,
wherein the set of catalog metadata is a subset of catalog metadata stored in the first backup catalog, wherein the catalog metadata stored in the first backup catalog comprises additional catalog metadata describing an additional plurality of files stored in one or more additional archives.

3. The computer-implemented method of claim 1,
wherein the metadata object comprises a metadata file stored on the first backup storage device;
wherein the archive comprises an archive file stored on the first backup storage device; and
wherein the metadata file is stored as a separate file from the archive file on the first backup storage device.

4. The computer-implemented method of claim 1, further comprising:
receiving input designating the plurality of files stored in the archive for replication;
wherein storing the metadata object on the first backup storage device is performed automatically in response to receiving the input designating the plurality of files stored in the archive for replication.

5. The computer-implemented method of claim 1, further comprising:
receiving input designating the plurality of files stored in the archive on the first backup storage device as a disaster recovery set;
wherein copying the metadata object and the archive to the second backup storage device is performed automatically in response to receiving the input designating the plurality of files stored in the archive as the disaster recovery set.

6. A non-transitory, computer-readable storage medium comprising program instructions, wherein the program instructions are computer-executable to implement:
storing an archive on a first backup storage device, wherein the archive comprises a plurality of files copied from a primary storage device;
storing a metadata object on the first backup storage device, wherein the metadata object comprises a set of catalog metadata describing the plurality of files stored in the archive, and wherein the metadata object is generated from a first backup catalog;

copying the metadata object and the archive from the first backup storage device to a second backup storage device, wherein copying the metadata object and the archive comprises generating a replicated metadata object and a replicated archive stored on the second backup storage device;

automatically detecting the replicated metadata object on the second backup storage device based on a name of the replicated metadata object, wherein the name of the replicated metadata object and a name of the replicated archive comprise a common substring indicating a relationship between the replicated metadata object and the replicated archive, and wherein the name of the replicated metadata object comprises an additional substring indicating that the replicated metadata object comprises catalog metadata; and importing the set of catalog metadata into a second backup catalog, wherein the imported set of catalog metadata is read from the replicated metadata object stored on the second backup storage device instead of from the replicated archive, wherein importing the set of catalog metadata comprises updating the second backup catalog to describe the plurality of files stored in the replicated archive on the second backup storage device, and wherein importing the set of catalog metadata is performed automatically in response to automatically detecting the additional substring in the name of the replicated metadata object on the second backup storage device.

7. The non-transitory, computer-readable storage medium of claim 6,
wherein the set of catalog metadata is a subset of catalog metadata stored in the first backup catalog, wherein the catalog metadata stored in the first backup catalog comprises additional catalog metadata describing an additional plurality of files stored in one or more additional archives.

8. The non-transitory, computer-readable storage medium of claim 6,
wherein the metadata object comprises a metadata file stored on the first backup storage device;
wherein the archive comprises an archive file stored on the first backup storage device; and
wherein the metadata file is stored as a separate file from the archive file on the first backup storage device.

9. The non-transitory, computer-readable storage medium of claim 6, wherein the program instructions are further computer-executable to implement:
receiving input designating the plurality of files stored in the archive for replication;
wherein storing the metadata object on the first backup storage device is performed automatically in response to receiving the input designating the plurality of files stored in the archive for replication.

10. A system comprising:
a first computer system comprising a first processor and a first memory;
a second computer system comprising a second processor and a second memory;
a primary storage device coupled to the first computer system;
a first backup storage device coupled to the first computer system; and
a second backup storage device coupled to the second computer system;

wherein the first memory stores first program instructions executable by the first processor to:
- store an archive on the first backup storage device, wherein the archive comprises a plurality of files copied from the primary storage device;
- store a metadata object on the first backup storage device, wherein the metadata object comprises a set of catalog metadata describing the plurality of files stored in the archive, and wherein the metadata object is generated from a first backup catalog;
- copy the metadata object and the archive from the first backup storage device to the second backup storage device, wherein copying the metadata object and the archive comprises generating a replicated metadata object and a replicated archive stored on the second backup storage device;

wherein the second memory stores second program instructions executable by the second processor to:
- detect the replicated metadata object on the second backup storage device based on a name of the replicated metadata object, wherein the name of the replicated metadata object and a name of the replicated archive comprise a common substring indicating a relationship between the replicated metadata object and the replicated archive, and wherein the name of the replicated metadata object comprises an additional substring indicating that the replicated metadata object comprises catalog metadata; and
- import the set of catalog metadata into a second backup catalog, wherein the imported set of catalog metadata is read from the replicated metadata object stored on the second backup storage device instead of from the replicated archive, wherein importing the set of catalog metadata comprises updating the second backup catalog to describe the plurality of files stored in the replicated archive on the second backup storage device, and wherein importing the set of catalog metadata is performed automatically in response to automatically detecting the additional substring in the name of the replicated metadata object on the second backup storage device.

11. The system of claim 10,
wherein the set of catalog metadata is a subset of catalog metadata stored in the first backup catalog, wherein the catalog metadata stored in the first backup catalog comprises additional catalog metadata describing an additional plurality of files stored in one or more additional archives.

12. The system of claim 10,
wherein the metadata object comprises a metadata file stored on the first backup storage device;
wherein the archive comprises an archive file stored on the first backup storage device; and
wherein the metadata file is stored as a separate file from the archive file on the first backup storage device.

13. A system comprising:
- means for storing an archive on a first backup storage device, wherein the archive comprises a plurality of files copied from a primary storage device;
- means for storing a metadata object on the first backup storage device, wherein the metadata object comprises a set of catalog metadata describing the plurality of files stored in the archive, and wherein the metadata object is generated from a first backup catalog;
- means for copying the metadata object and the archive from the first backup storage device to a second backup storage device, wherein copying the metadata object and the archive comprises generating a replicated metadata object and a replicated archive stored on the second backup storage device;
- means for automatically detecting the replicated metadata object on the second backup storage device based on a name of the replicated metadata object, wherein the name of the replicated metadata object and a name of the replicated archive comprise a common substring indicating a relationship between the replicated metadata object and the replicated archive, and wherein the name of the replicated metadata object comprises an additional substring indicating that the replicated metadata object comprises catalog metadata; and
- means for importing the set of catalog metadata into a second backup catalog, wherein the imported set of catalog metadata is read from the replicated metadata object stored on the second backup storage device instead of from the replicated archive, wherein importing the set of catalog metadata comprises updating the second backup catalog to describe the plurality of files stored in the replicated archive on the second backup storage device, and wherein importing the set of catalog metadata is performed automatically in response to automatically detecting the additional substring in the name of the replicated metadata object on the second backup storage device.

\* \* \* \* \*